US006689276B2

(12) United States Patent
Caruthers, Jr.

(10) Patent No.: US 6,689,276 B2
(45) Date of Patent: Feb. 10, 2004

(54) AUTONOMOUS CLEANING APPARATUS AND METHOD

(75) Inventor: Eddie Lee Caruthers, Jr., Missouri City, TX (US)

(73) Assignee: Eco-Safe Technologies, L.L.C., Provo, UT (US)

( * ) Notice: Subject to any disclaimer, the term of this patent is extended or adjusted under 35 U.S.C. 154(b) by 57 days.

(21) Appl. No.: 10/144,331

(22) Filed: May 13, 2002

(65) Prior Publication Data

US 2002/0132752 A1 Sep. 19, 2002

Related U.S. Application Data

(62) Division of application No. 09/437,532, filed on Nov. 10, 1999, now Pat. No. 6,403,501.

(51) Int. Cl.[7] .......................... C11D 13/00; C11D 17/00; C02F 1/42

(52) U.S. Cl. ........................... 210/687; 210/670; 8/137; 510/352; 510/446; 510/459

(58) Field of Search ................................ 210/687, 670; 8/137; 510/352, 446, 459; 252/179

(56) References Cited

U.S. PATENT DOCUMENTS

| | | | | | |
|---|---|---|---|---|---|
| 3,507,624 | A | | 4/1970 | Schneider, Jr. et al. | 137/268 |
| 3,615,244 | A | * | 10/1971 | Long et al. | 222/630 |
| 3,680,703 | A | * | 8/1972 | Borochaner | 210/136 |
| 3,715,314 | A | | 2/1973 | Morgenstern | 510/368 |
| 3,726,304 | A | | 4/1973 | Cook | 137/268 |
| 3,772,193 | A | | 11/1973 | Nelli et al. | 210/62 |
| 4,025,427 | A | * | 5/1977 | Loeb | 210/675 |
| 4,121,903 | A | * | 10/1978 | Smolka | 8/137 |
| 4,228,000 | A | * | 10/1980 | Hoeschler | 210/673 |
| 5,118,439 | A | | 6/1992 | Urfer et al. | 252/174.17 |
| 5,204,006 | A | * | 4/1993 | Santoli | 210/696 |
| 5,316,692 | A | | 5/1994 | John | 510/397 |
| 5,650,017 | A | | 7/1997 | Gordon et al. | 134/7 |
| 5,665,694 | A | | 9/1997 | Backes et al. | 510/480 |
| 5,711,920 | A | | 1/1998 | Barford et al. | 422/282 |
| 5,755,330 | A | | 5/1998 | Siragusa et al. | 206/524.1 |
| 5,810,043 | A | | 9/1998 | Grenier | 137/268 |
| 5,827,434 | A | | 10/1998 | Yando | 210/754 |
| 5,870,906 | A | | 2/1999 | Denisar | 68/17 R |
| 5,873,268 | A | | 2/1999 | Spriggs et al. | 137/268 |
| 5,962,389 | A | | 10/1999 | Partee et al. | 510/276 |
| 6,063,747 | A | | 5/2000 | Warwick | 510/224 |
| 6,178,987 | B1 | | 1/2001 | Caruthers, Jr. et al. | 510/480 |
| 6,262,004 | B1 | * | 7/2001 | Caruthers, Jr. | 510/294 |
| 6,403,551 | B1 | * | 6/2002 | Caruthers, Jr. | 510/459 |

FOREIGN PATENT DOCUMENTS

| | | |
|---|---|---|
| GB | 2109398 | 6/1983 |
| WO | WO 91/17232 | 11/1991 |
| WO | WO 98/04672 | 2/1998 |

* cited by examiner

*Primary Examiner*—Gregory Webb
(74) *Attorney, Agent, or Firm*—Madson & Metcalf

(57) ABSTRACT

An apparatus, method, and composition provide a long-term, solid cartridge made of cleaning agents mixed at an equilibrium concentration with a solubility limiting agent for controlling an equilibrium concentration of the composition in a solvent, such as water, for example. In use, the cleaning agents are dissolved only to a predetermined concentration needed for a single dose of a cleaning appliance, such as a clothes washing machine, for example. The apparatus may be configured to cyclically expose the solid cartridge to the solvent. A dosing amount of the solvent dissolves a predetermined concentration of cleaning agents, controlled by the solubility limiting agent. The apparatus discharges the dose of cleaning agent to a cleaning appliance, and readies itself again by dissolving a dose of cleaning agent from a surface of the solid cartridge into the solvent. An equilibrium concentration of sodium bicarbonate with amorphous silica provides the cleaning agent and solubility control, with additional sodium sesquicarbonate for alkalinity control and zeolite for scavenging hard water ions. The putty-like mixture may be cast, cured, and cooled to form a solid, monolithic charge in a desirable shape for controlling surface area.

18 Claims, 17 Drawing Sheets

AUTONOMOUS CLEANING APPARATUS AND METHOD

This is a division of application Ser. No. 09/437,532 filed Nov. 10, 1999 now U.S. Pat. No. 6,403,501.

BACKGROUND OF THE INVENTION

1. The Field of the Invention

The present invention relates to cleaning systems, and, more specifically, methods, apparatus, and compositions for cleaning with water, including compositions and dispensers for controlling concentrations of cleaning agents delivered into water.

2. The Relevant Technology

Chemical cleaning agents, in one form or another, have long been used to remove dirt, oil, and particulate matter from a wide variety of articles. Cleaning improves the visual and tactile impression of an article, kills potentially harmful microbes, removes particles that interfere with breathing and vision, and may even extend the life of the article being cleaned. Things such as cookware, homes, automobiles, clothing, and the human body itself stand to benefit from the development of enhanced cleaning agents. Although the present invention contemplates cleaning systems useful for cleaning a wide variety of articles, it is particularly well-adapted for cleaning clothes, as in a washing machine.

Soaps and detergents are two of the most common cleaning agents presently used. While they are often used interchangeably, the words "soap" and "detergent" actually denote different classes of compounds.

Soaps are made by a process of saponification wherein a fatty acid reacts with abase to yield the salt of the fatty acid, i.e., a soap. Soap probably has its origin in reacting animal fats, or lard, with alkaline salts, such as wood ash. Today, they are largely synthesized from animal fats and plant oils. Molecules of soap owe their cleaning capacity to their amphiphilic structure, which includes a hydrophobic portion consisting of a long hydrocarbon chain, and a hydrophilic portion composed of an ionic group at one end of the hydrocarbon chain. Because of the hydrocarbon chain, a molecule of soap is not truly soluble in water. Numerous molecules of soap will suspend in water as micelles, or clusters of molecules with long hydrocarbon chains in the inner portions of the cluster, and ionic, water soluble ends facing the polar water.

Because these micelles form hydrophobic centers, they are able to dissolve other non-polar substances, like oils. Once the non-polar, oily dirt is dissolved within the micelles of soap, the ionic surfaces of the micelle repel each other, suspending the oil droplets and preventing them from coalescing. In this fashion, dirt and oil become trapped within the water soluble micelles, and wash away with the water.

A primary disadvantage of soaps is that they form insoluble salts (precipitates) with ions found in hard water. These salts, usually formed when $Ca^{++}$ and $Mg^{++}$ ions react with the carboxylate ends of soap molecules, precipitate out of solution as bathtub rings, grits, and other deposits. Water softeners that exchange $Ca^{++}$ and $Mg^{++}$ ions for more soluble $Na^{+}$ ions can alleviate most of this problem.

Most laundry products and many household cleansers actually contain detergents, not soaps. A detergent is a compound with a hydrophobic hydrocarbon chain plus a sulfonate or sulfate ionic end (whereas soaps have carboxylic ends). Because detergents also have an amphiphilic structure, they also form micelles and clean in the same fashion as soaps. However, detergents have the advantage that most metal alkylsulfonates and sulfates are water-soluble. Therefore, detergents do not precipitate out of solution with metal ions found in water. As a result, detergents are not inhibited by hard water. In addition, detergents can be synthesized with continuous chain alkyl groups, which are more easily broken down, or biodegraded, into smaller organic molecules by the microorganisms in septic tanks and sewage treatment plants.

A drawback of most detergents is that they contain additives that take much longer to biodegrade. Some components containing phosphates must be treated in plants. Phosphates therefore promote algae growth, chocking bodies of water and streams. Another disadvantage of detergents is that they can leave behind an undersireable residue even after thorough rinsing.

Detergents are currently used in many household appliances, such as dishwashers and washing machines. Presently, a user must measure out a dose of detergent to add to the cleaning appliance before every cleaning cycle. Conventional packaging and use of detergents creates messy clutter, consumes time, and typically results in a waste of detergent from overdosing. In addition, most washing machines for clothing use a separate rinsing cycle in order to remove the residue. Thus, additional time, water, and heat energy are required to complete the washing process.

It would be a great advancement in the art to provide a novel cleaning system that uses a novel non-detergent composition of cleaner that leaves no residue and therefore, requires no rinsing cycle. Another improvement in the art would be to provide a cleaning agent that is completely biodegradable. Still another improvement would be if this cleaning agent were made from all natural materials. It would also be a great advancement in the art to provide a new method for making a non-detergent cleaning agent. It would be another advancement in the art to provide a cleaning agent that cleans better than the detergents presently on the market. Furthermore, it would be an improvement in the art to simplify the cleaning process and ameliorate the resultant mess with improved, preferably measurement-free or automatic, dosing over many cleaning cycles.

OBJECTS AND BRIEF SUMMARY OF THE INVENTION

In accordance with the invention as embodied and broadly described herein, an apparatus, composition, and method are disclosed, in suitable detail to enable one of ordinary skill in the art to make and use the invention. In certain embodiments, an apparatus for dispensing cleaning agents in accordance with the present invention includes a vessel comprising a cavity with a cartridge support for mounting a replaceable cartridge.

In one embodiment, the cartridge comprises a novel composition of cleaning agent for cleaning, and solubility control component for controlling the equilibrium concentration of the cleaning composition in solution, further described below. A water source supplies water into the cavity, and a water feed conveys water from the cavity to a cleaning appliance such as a brush, wand, dishwasher, or washing machine for clothing. The apparatus provides a cleaning agent solution in water to the cleaning appliance.

In one embodiment, the inner cavity (and hence the cartridge) of the canister is flooded with water from a water source. The cartridge then dissolves to an equilibrium concentration within the vessel, thus forming a cleaning solution comprising a cleaning agent and a solubility control component to control the concentration of the cleaning agent. The vessel is then purged of the solution, which enters the water feed to be carried into a cleaning appliance.

Enough cleaning solution should be delivered to the feed, to bring the cleaning composition to cleaning concentration when diluted in the washing appliance. Cleaning concentration is the amount of cleaning composition necessary to clean those items serviced by (e.g. placed within) the cleaning appliance during a wash cycle. In particular, a cleaning concentration for a washing machine is that concentration needed to clean a load of clothing. The amount of cleaning composition delivered to the feed is controlled by the amount of cleaning solution and the cleaning solution's equilibrium concentration. Therefore, the vessel should be configured to receive a predetermined amount of solution, and the solubility control in the cartridge should be configured to dissolve a predetermined equilibrium concentration of cleaning composition in the vessel.

As explained, a composition of cleaner in accordance with the present invention may include a mixture of a cleaning agent and a solubility control agent in a solid state. In some embodiments, the mixture may also comprise an additional alkalinity agent and a water softener. The principal cleaning agent is preferably a gas-releasing compound, e.g. sodium bicarbonate. Gas-releasing compounds clean by reacting with acids (soils) and by mechanical microscrubbing as they yield carbon dioxide. The solubility control agent is preferably a material resistant to dissolving in water, e.g., amorphous silica. These compounds control solubility by dissolving only an equilibrium concentration of composition in solution.

The alkalinity agent is preferably a basic compound found in nature, e.g., sodium sesquicarbonate (which actually contains sodium bicarbonate and sodium carbonate in a substantially 1:1 ratio). The alkalinity agent prevents the cleaning agent from releasing carbon dioxide too quickly by increasing the pH of the solution. The water softener is preferably a naturally occurring material capable of solvating hard water ions, e.g., natural zeolite. The water softener prevents hard ions from reacting with other components to form insoluble salts.

The composition of cleaner may be formulated and cured into various shapes; however, a cylindrical cartridge with an annular cross section is presently preferred. The annular shaped cylinder has an advantage over other shapes in that, as it dissolves, it retains approximately the same surface area, and hence the same dissolution rate. This is because the annular shape yields an interior surface that increases in area at approximately the same rate as that of the exterior surface decreases.

The amount of solubility control component in the composition determines the equilibrium concentration of the composition in a solution, e.g., water. Therefore, the amount of solubility control component should be sufficient to yield a predetermined equilibrium concentration of composition. Similarly, the amount of cleaning agent should be sufficient to provide a predetermined amount of gas in solution. The amount of alkalinity agent should be sufficient to provide a predetermined pH in solution. The amount of water softener should be sufficient to soften household water in solution.

In certain embodiments, a method for making a composition of cleaner in a solid state may include providing a solvent, providing a gas-releasing agent, and providing a solubility control component. The method may also include providing an alkalinity agent. The fabrication process may typically include applying energy, mixing, and testing the composition for an equilibrium concentration. Completion of the process may include casting the composition in a shape selected to control surface area, cooling the composition, and curing the composition.

In other embodiments, a method for using an apparatus for delivering solvated cleaning agents to a cleaning appliance may include providing a dispensing apparatus, shutting off a water supply, opening the dispensing apparatus, installing a shaped block of a cleaning agent, and closing dispensing apparatus. Thereafter, the method may include turning water supply on, running wash cycles, and selectively dissolving a portion of the cleaning agent at a controlled rate with each fill cycle.

In certain embodiments of the present invention, a method for delivering cleaning solution to a cleaning appliance may include flooding a dispensing apparatus with a solvent, dissolving a portion of a hardened charge of cleaning agent, equilibrating a solution of cleaning agent, and flushing the dispensing apparatus. The method may include delivering a cleaning agent solution to a cleaning appliance, cleaning through basic reactions and gas release, and draining waste from the cleaning appliance.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of apparatus and methods possible in accordance with the invention, which are, therefore, not to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 18, is not intended to limit the scope of the invention, as claimed, but is merely representative of presently preferred embodiments of the invention.

Those of ordinary skill in the art will, of course, appreciate that various modifications to the details of the figures may easily be made without departing from the essential characteristics of the invention. Thus, the following description of the figures is intended only as an example, and simply illustrates one presently preferred embodiment that is consistent with the invention as claimed.

Figure 1:
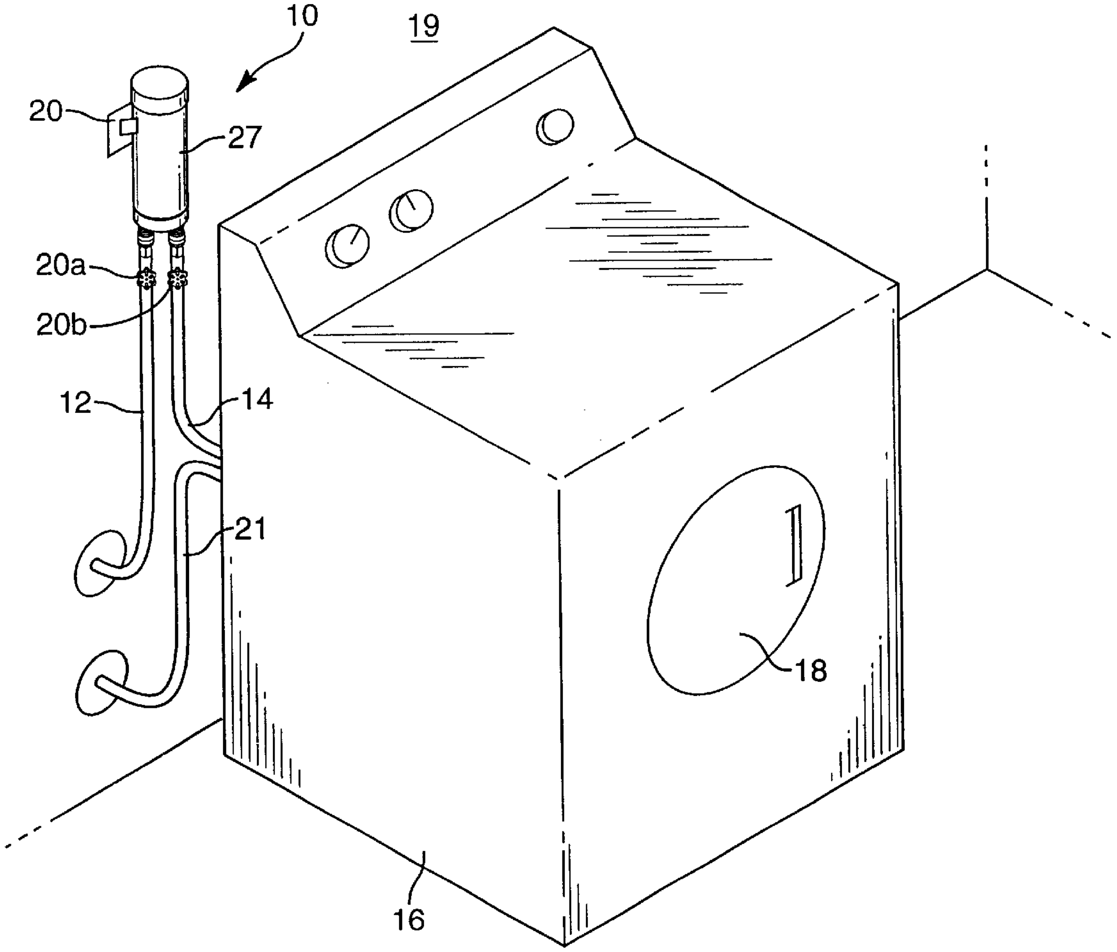
FIG. 1 is a perspective view of a cleaning appliance provided with an apparatus in accordance with the invention.

Referring to FIG. 1, the present invention relates to an apparatus 10 for delivering cleaning compositions 11 in solvated form, that may be disposed between a water supply 12 and water feed 14. In one preferred embodiment, the water feed 14 leads to a cleaning appliance 16 (e.g., a washing machine). The apparatus 10 may deliver a cleaning solution 17 of cleaning agent to a cleaning chamber 18 of the cleaning appliance 16.

The apparatus 10 may be mounted to any suitable surface, such as a wall 19 near the cleaning appliance 16, by a mount 20, as shown in FIG. 1. Those skilled in the art will appreciate that the mount 20 may take various forms, including a bracket system, a mount arm, a shelf, and various other forms capable of fixing the apparatus 10 to a surface. The water supply 12 preferably provides comparatively unheated water. A separate line 21 may convey heated water to the cleaning appliance 16.

The water supply 12 and water feed 14 may also have valves 22(*a*) and 22(*b*) connected to allow a user to turn a water flow on and off. The valves 22(*a*) and 22(*b*) may take various forms known in the art, including ball valves, sliding spool valves, solenoid valves, and any other type of valve with a manual or electronic control whereby a user may control a flow of water flowing through the apparatus 10. In particular, the valve 22(*a*) may be situated on the water supply 12 to control flows into the apparatus 10, and the valve 22(*b*) may be positioned on the water feed 14 to control flows from the apparatus 10 to the cleaning appliance 16.

Figure 2:
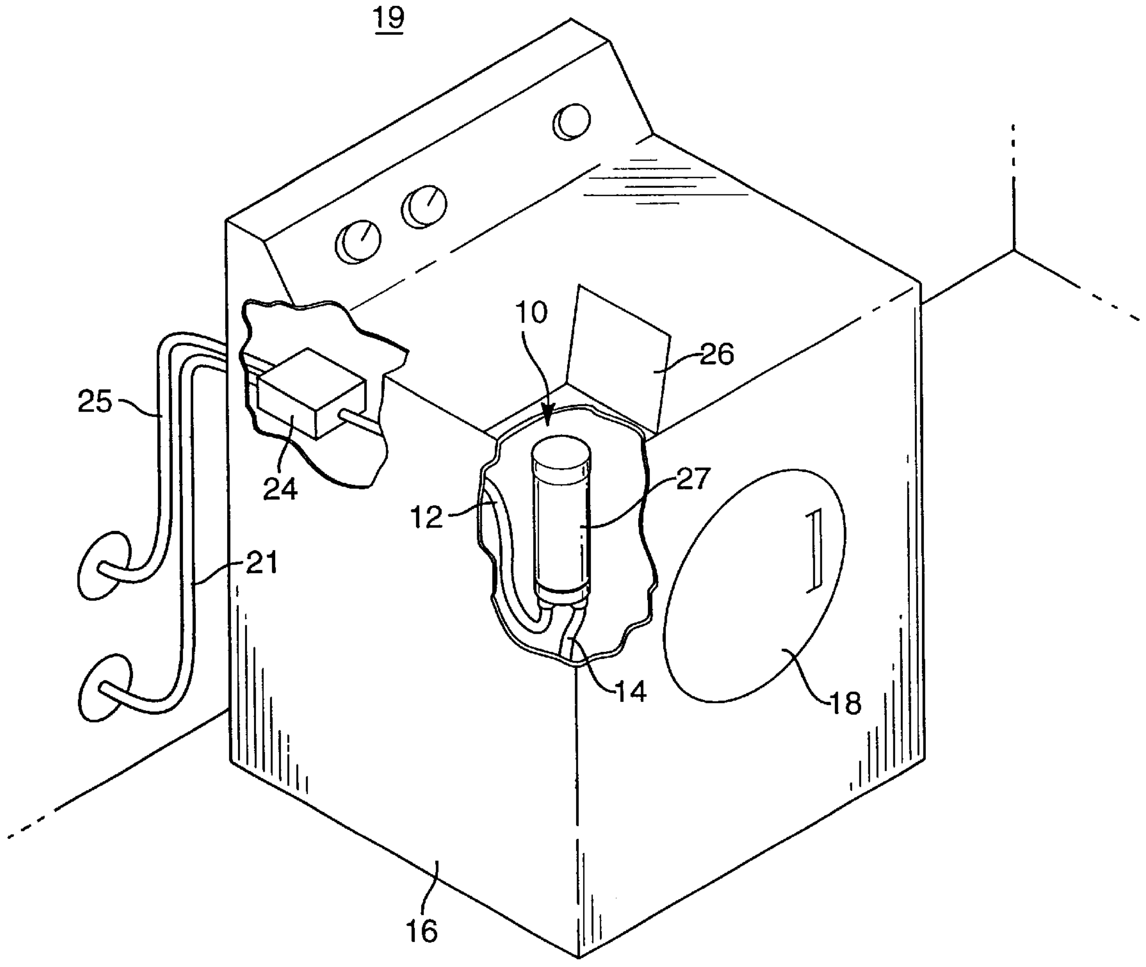
FIG. 2 is a perspective view of a cleaning appliance having a built-in vessel and control in accordance with the invention.

In an alternative embodiment of the invention, best illustrated in FIG. 2, the apparatus 10 may be contained within the cleaning appliance 16. A water mixer 24 combines flows from a line 21 conveying heated water and a line 25 supplying cold water. The apparatus 10 is preferably positioned downstream from the water mixer 24, as depicted in FIG. 2, but may also be positioned on the line 21 or the line 25. As with the previously described embodiment, the water feed 14 conveys solvated water from the apparatus 10 to the cleaning chamber 18. The cleaning appliance 16 may have a hatch 26 to allow access to the apparatus 10. Numerous other plumbing configurations, including a bypass system, could also be used according to methods known in the art.

Figure 3:
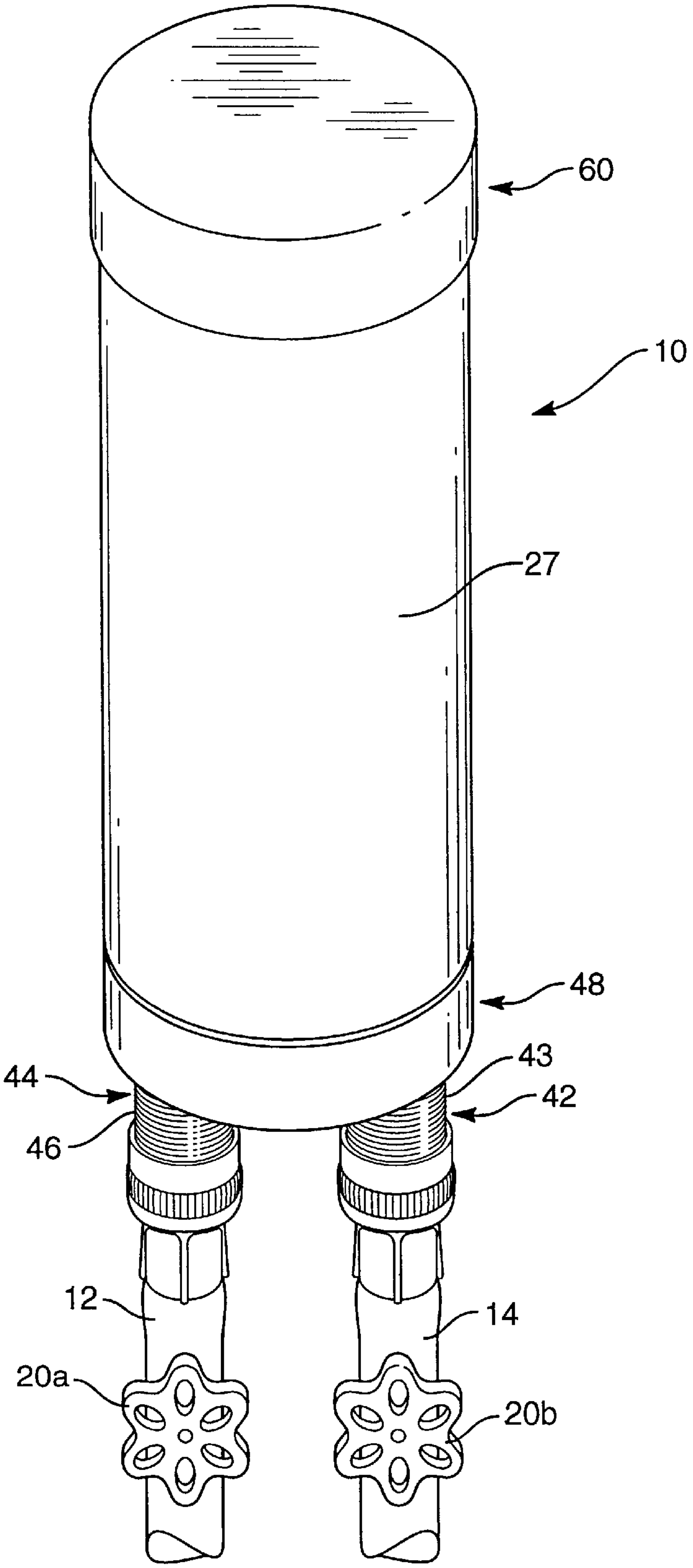
FIG. 3 is a perspective view of an apparatus in accordance with the invention.
Figure 4:
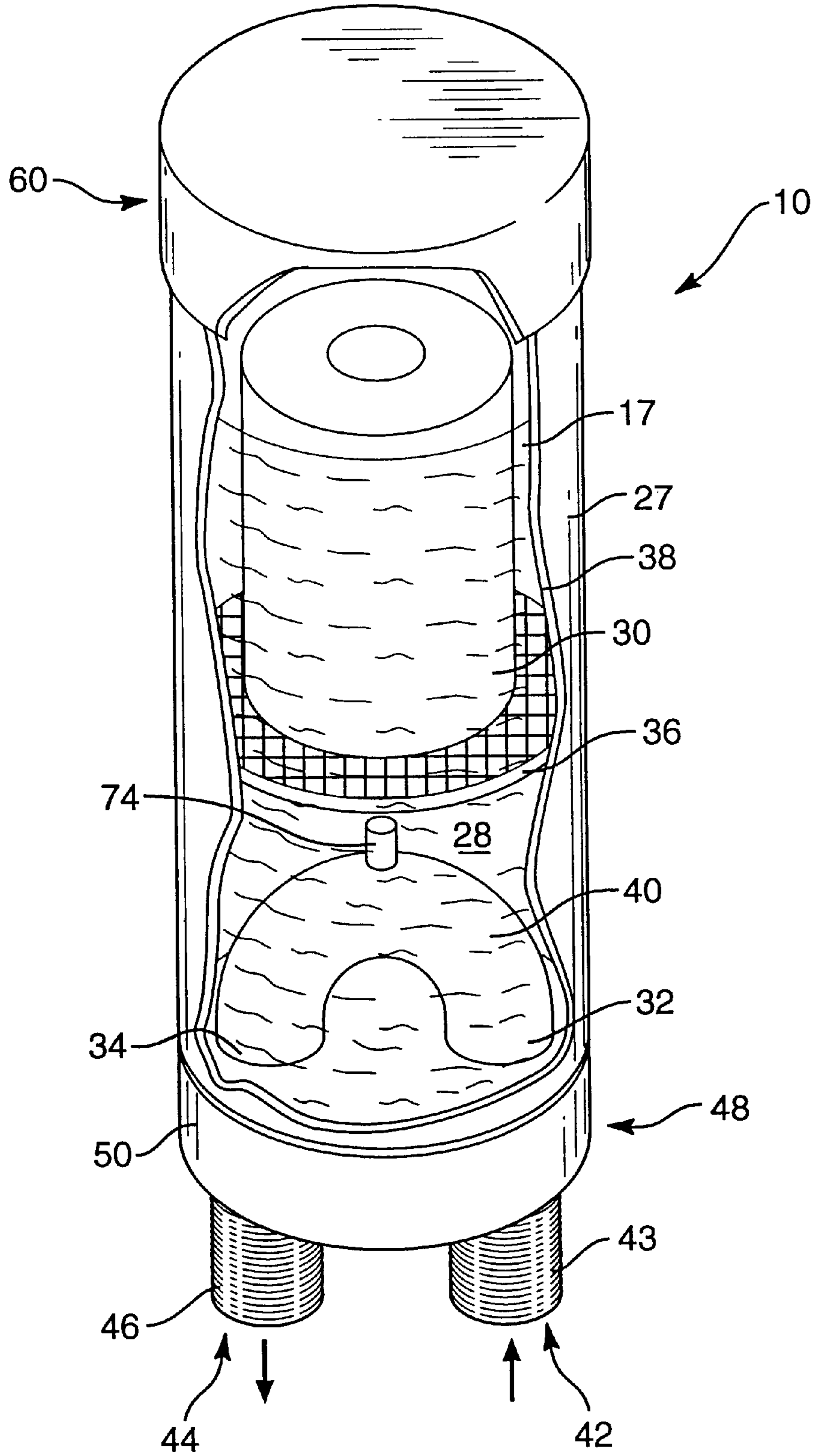
FIG. 4 is a partially-cutaway perspective view of one embodiment of the apparatus of FIG. 3.

Referring to FIGS. 3 and 4, one possible embodiment of the apparatus 10 of the present invention has a vessel 27 for containing water in an interior cavity 28 thereof. The vessel 27 may take any shape that maintains an interior cavity 28 to accommodate a cartridge 30 of solidified cleaning composition 11. However, a cylindrical shape with an annular cross section is presently preferred. The vessel 27 may be constructed out of any air and water tight material, including metals, plastics, ceramics, composites, etc. The apparatus 10 further has an inlet port 32 formed in the vessel 27 to permit the ingress of water from a water supply 12 to the interior cavity 28, and an outlet port 34 formed in the vessel 27 for flushing water from the interior cavity 28 into a water feed 14. Thus, water flows into and out of the vessel 27 in the direction of the arrows shown in FIG. 4.

In one embodiment of the present invention, best illustrated in FIG. 4, the vessel 27 includes a support 36. The support 36 may be any structure that supports a cartridge 30 of solidified cleaning composition 11, including an interior wall 38 of the vessel 27 itself. However, in the presently preferred embodiment, the support 36 is a separate structure attached to the interior wall 38 of the vessel 27 such that it spans a cross section of the vessel 27. The cartridge 30 may then rest on the support 36 when the vessel 27 is in the upright position, as illustrated in FIG. 3. The support 36 may be configured to accommodate cartridges of different sizes and shapes.

Preferably, the support 36 is water permeable, and may be composed of a simple mesh to allow water to flow freely between the inlet and outlet ports 32 and 34 and the cartridge 30 while maintaining a separation therebetween. When the cartridge 30 is immersed in water, a cleaning solution 17 is formed and retained within the interior cavity 28.

Flows through the inlet port 32 and outlet port 34 may converge in a mixing tube 40. The mixing tube 40 may run through the interior cavity 28 and may also be U-shaped to connect the water supply 12 with the water feed 14 through the inlet and outlet ports 32 and 34, respectively. Water may be conveyed through the inlet port 32 via an inlet fitting 42, disposed on the outside of the vessel 27 with a fastener 43 to connect the water supply 12. Although the fastener 43 may take any form selected to couple the inlet fitting 42 to the water supply 12, threads 43 on the inlet fitting 42, for engagement with similar threads on the water supply 12, are preferable. The outlet port 34 may have an outlet fitting 44, disposed on the outside of the vessel 27, with a fastener 46 that may also take the form of threads 46. It will be readily appreciated by those skilled in the art that the inlet fitting 42 and outlet fitting 44 may take any form adapted to connect a water supply 12 and a water feed 14, respectively, and such forms are within the scope of the present invention.

Figure 5:
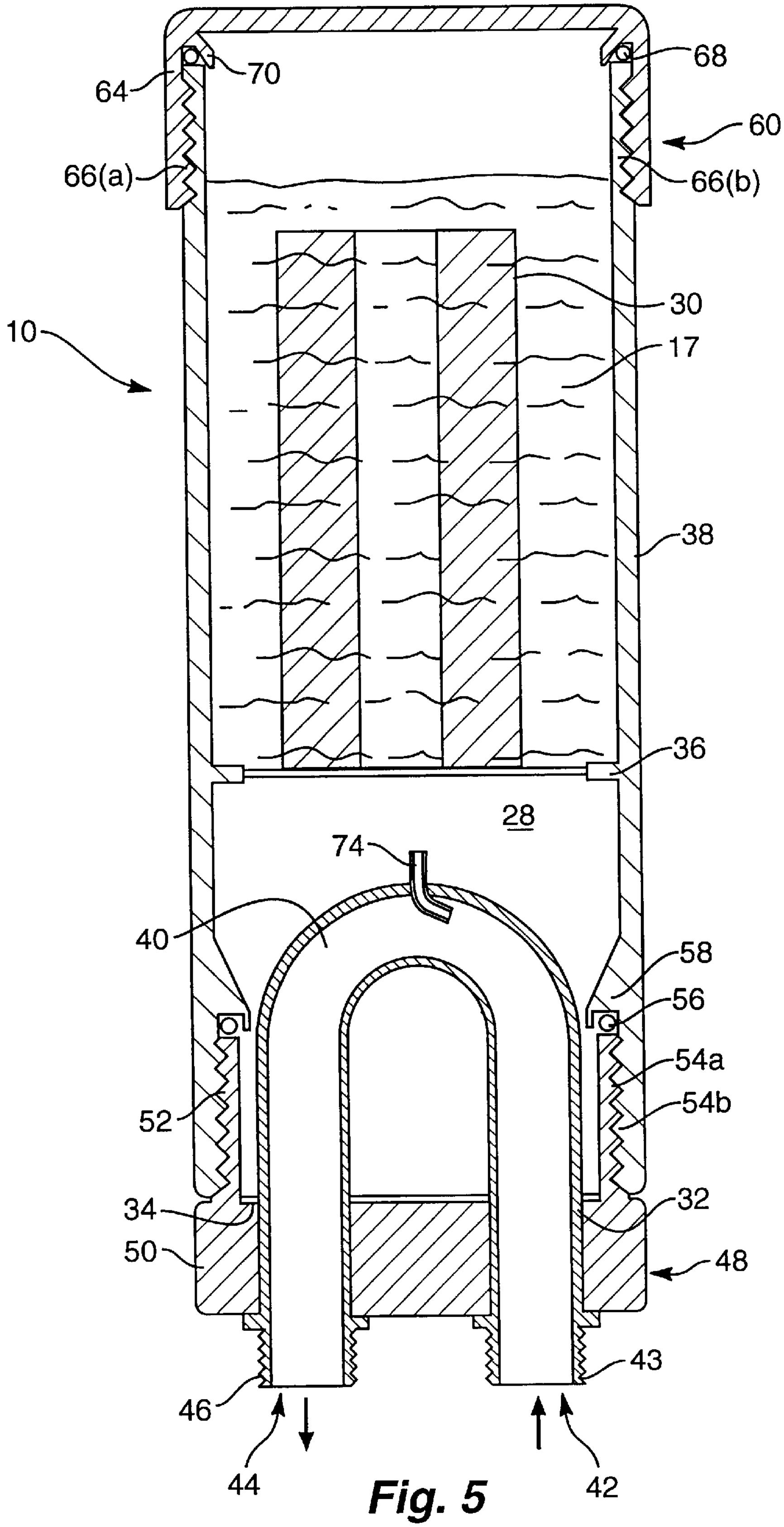
FIG. 5 is a side elevation section view of one embodiment of the apparatus of FIG. 3.
Figure 6:
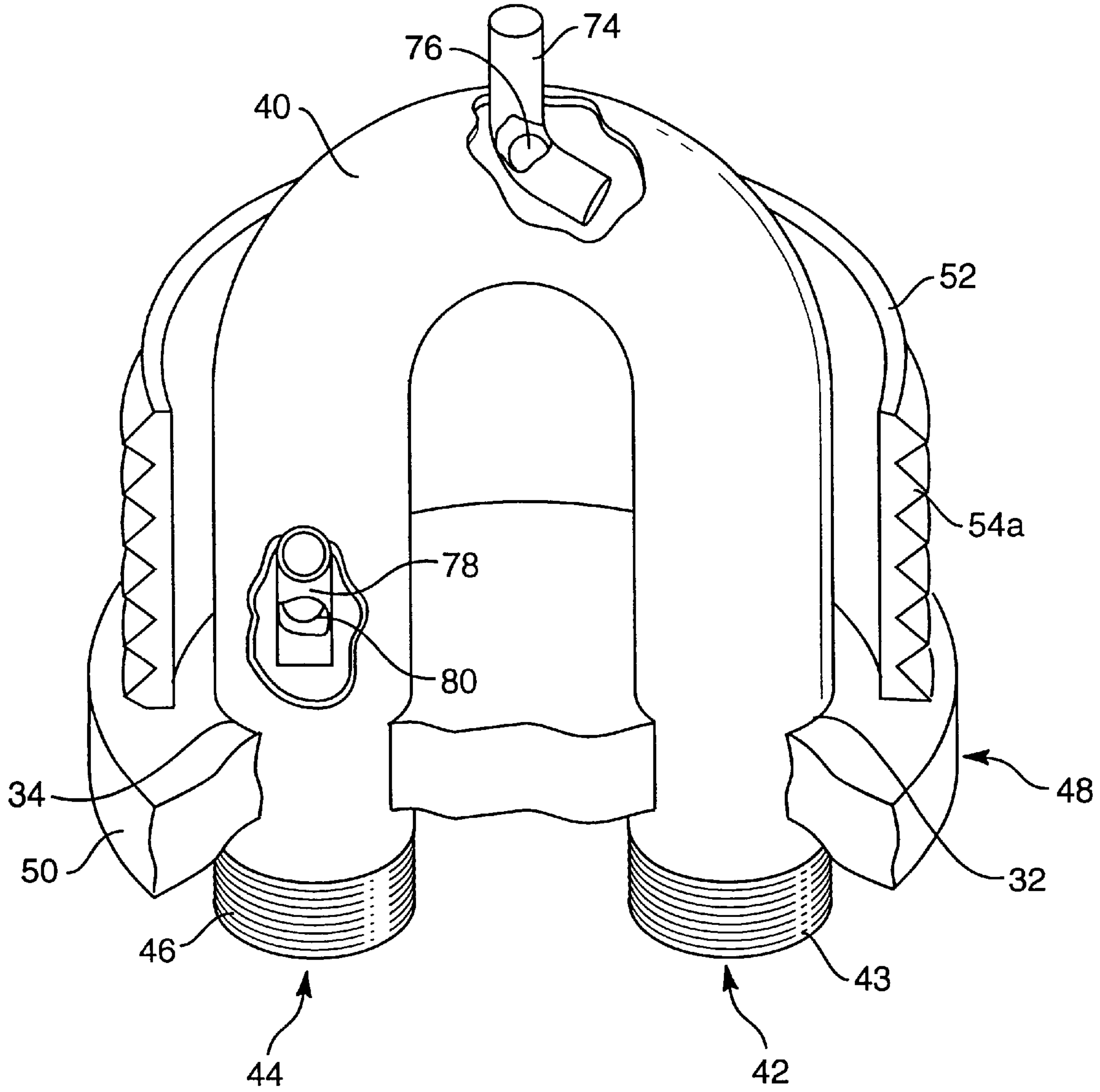
FIG. 6 is a perspective view of the fill and purge system suitable for the apparatus of FIG. 3.

Referring now to FIGS. 5 and 6, and according to one embodiment of the present invention, the vessel 27 may have a bottom cap 48 with a base 50 and an annular wall 52. The base 50 may be circular in shape and may be unitary with the annular wall 52, which may extend perpendicular to the base 50 to fit into the interior cavity 28 of the vessel 27. The annular wall 52 preferably includes threads 54(*a*) to engage similar threads 54(*b*) on the interior wall 38 of the vessel 27. A user may affix the bottom cap 48 to the vessel 27 by twisting or screwing the threads 54(*a*) and 54(*b*) into an interlocking position, best illustrated in FIG. 5. Other methods for affixing the bottom cap 48 to the vessel 27, including latches, friction fittings, separate fasteners, and others, are known in the art.

The bottom cap 48 may form a water-tight seal with the vessel 27 when the wall 52 engages an o-ring 56, held in place by a lip 58 disposed on the interior wall 38 of the vessel 27. As shown in FIG. 6, the mixing tube 40 may extend through the base 50 of the bottom cap 48 and into the interior cavity 28, to permit easy connection and disconnection of the water supply 12 and the water feed 14.

In one preferred embodiment, the inlet port 32 has an intake system 74 connected to the mixing tube 40 for delivering water from the mixing tube 40 into the interior cavity 28. This intake system 74 may take various forms, but a simple bent tube, hereinafter a separation tube 74, as illustrated in FIG. 6, is presently preferred. As water runs through the mixing tube 40 from the water supply 12 to the feed 14, the separation tube 74 diverts some water into the interior cavity 28. If the mixing tube 40 and the separation tube 74 are unobstructed, the vessel 27 may fill completely with water. Alternatively, as illustrated in FIG. 6, a valve 76, such as a check valve in the separation tube 74, may limit flow into the interior cavity 28. The valve 76 may also be positioned within the mixing tube 40. In one embodiment, a valve 76 may be configured to allow only a predetermined amount of water to enter the interior cavity 28, by means such as a flow control valve, or a metering valve, for example.

As shown in FIG. 6, the mixing tube 40 also has a delivery system 78 connected to the mixing tube 40 for delivering water from the interior cavity 28 back into the mixing tube 40. The delivery system 78 may take various forms, but a siphon tube 78 is presently preferred. As water flows through the mixing tube 40 from the water supply 12 to the feed 14, it encounters the siphon tube 78, which decreases the cross-sectional area of the mixing tube 40. The result is a venturi effect. An area of comparatively low pressure water forms about the siphon tube 78 to draw water out of the interior cavity 28 and into the mixing tube 40. In this embodiment, the outlet port 34 is passive.

If the mixing tube 40 and the siphon tube 78 are unobstructed, the vessel 27 is continuously flushed as water circulates through the mixing tube 40. However, in the embodiment illustrated in FIG. 6, a valve 80, such as a check valve in the siphon tube 78, may limit flow out of the interior cavity 28. The valve 80 may also be positioned within the mixing tube 40. The valve 80 may be configured to allow only a predetermined amount of water to leave the interior cavity 28, such as a flow control valve, or a metering valve by way of example.

As shown in FIG. 5, the vessel 27 may also have a top cap 60, which may be removable to allow access to the interior cavity 28. The top cap 60 has a base 62 that is substantially circular with an annular wall 64 running perpendicular to the base 62 near its outer circumference. The inner portion of the wall 64 has threads 66(*a*) that engage similar threads 66(*b*) on the outer wall of the vessel 27. A user may affix the top cap 60 to the vessel 27 by twisting or screwing the threads 66(*a*) and 66(*b*) together into an interlocking position. As with the bottom cap 48, numerous methods for affixing the top cap 60 to the vessel 27 are within the scope of the present invention, including latches, friction fittings, separate fasteners, etc. The top cap 60 forms a water tight seal with the vessel 27 when the wall of the vessel 27 engages an o-ring 68, held in place by a lip 70 disposed along the inner circumference of the base 62.

Figure 7:
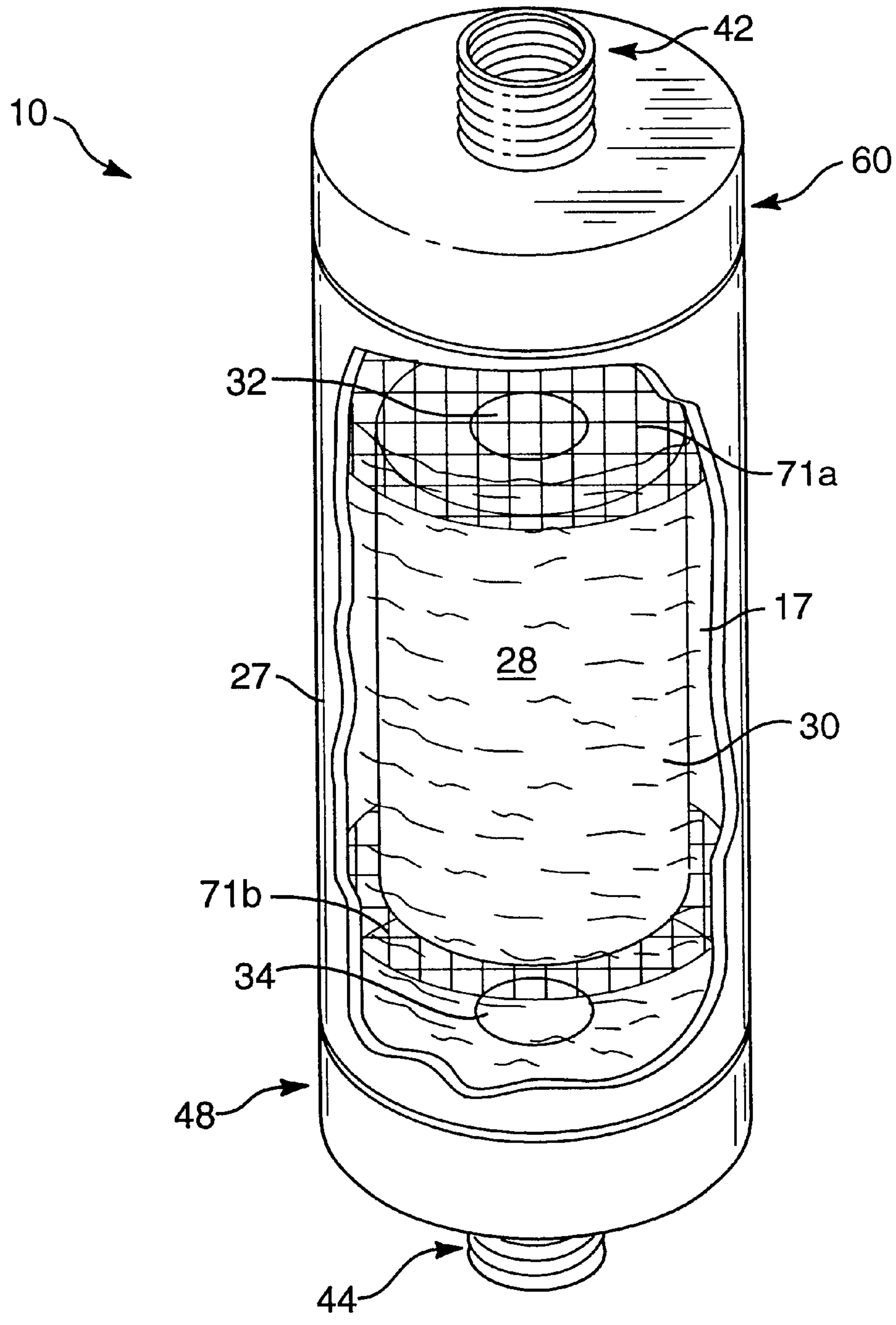
FIG. 7 is a cutaway perspective view of an alternative embodiment of the apparatus of the invention.

Referring to FIG. 7, in an alternative embodiment, the inlet port 32 and the outlet port 34 of the vessel 27 may be configured with a flow-through design. In this embodiment, the inlet and outlet ports 32 and 34 are disposed on opposite ends of the vessel 27, with the interior cavity 28 between the inlet and outlet ports 32 and 34. The cartridge 30 may be held within the vessel 27 by separators 71(*a*) and 71(*b*) that are water permeable and preferably constructed of a mesh material. The separator 71(*a*) separates the cartridge 30 from the inlet port 32. The separator 71(*b*), in turn, separates the cartridge 30 from the outlet port 34.

Figure 8:
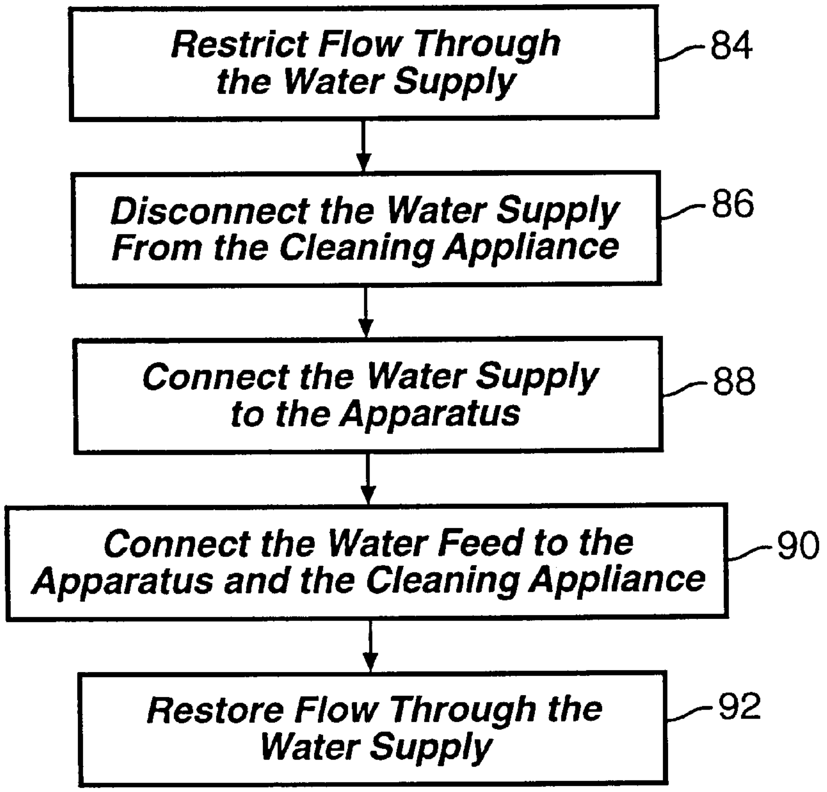
FIG. 8 is a schematic diagram of a method for connecting a cleaning apparatus to an apparatus suitable for the invention.

Referring to FIG. 8, one method of connecting the apparatus 10 to the cleaning appliance 16 is shown. This method applies to several different cleaning processes. Although the apparatus 10 may be configured in several different ways for use with this method, the following descriptions for FIGS. 8, 9, and 10 relate directly to the exemplary embodiments described in connection with FIGS. 1 and 3–6.

In a typical cleaning appliance 16 of the type used to wash clothing, the water supply 12 and the heated water line 21 connect directly to the cleaning appliance 16. Thus, in a first step 84, a user may be required to restrict the flow of water through the water supply 12 by closing the valve 22(*a*) before disconnecting the water supply 12 from the cleaning appliance 16. Then, in a second step 86, a user may disconnect the water supply 12 from the cleaning appliance 16. A user then connects the water supply 12 to the apparatus 10 via the inlet fitting 42 in a third step 88. Then, in a fourth step 90, a user connects the water feed 14 to the vessel 27 via the outlet fitting 44 and to the cleaning appliance 16. In a fifth step 92, a user may open the valve 22(*a*) to turn the water back on.

Figure 9:
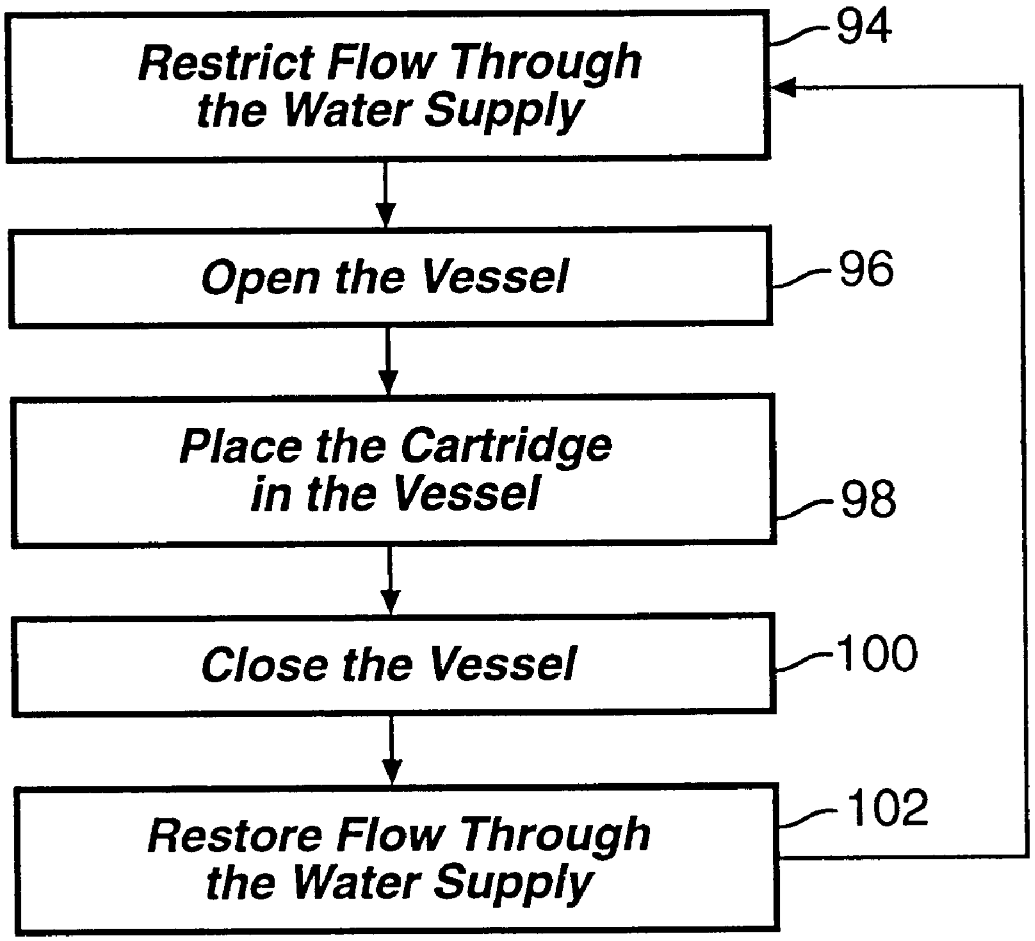
FIG. 9 is a schematic diagram of a method for using a cleaning system in accordance with the invention.

Referring to FIG. 9, a method for using the apparatus 10, after connection to a cleaning appliance 16 through the steps described above, is disclosed. In a first step 94, a user shuts off the water supply by closing the valve 22(*a*). A user then opens the vessel 27, by removing the top cap 60, in a second step 96. In a third step 98, the cartridge 30 is placed in the interior cavity 28 of the vessel 27. In a fourth step 100, a user closes the vessel 27 by replacing the top cap 60. A user may then turn the water supply on again, in a fifth step 102, by turning on valve 22(*a*). After the cartridge 30 has become depleted through use, a user may repeat steps 94–102 to install a new cartridge 30 for further washing.

Figure 10:
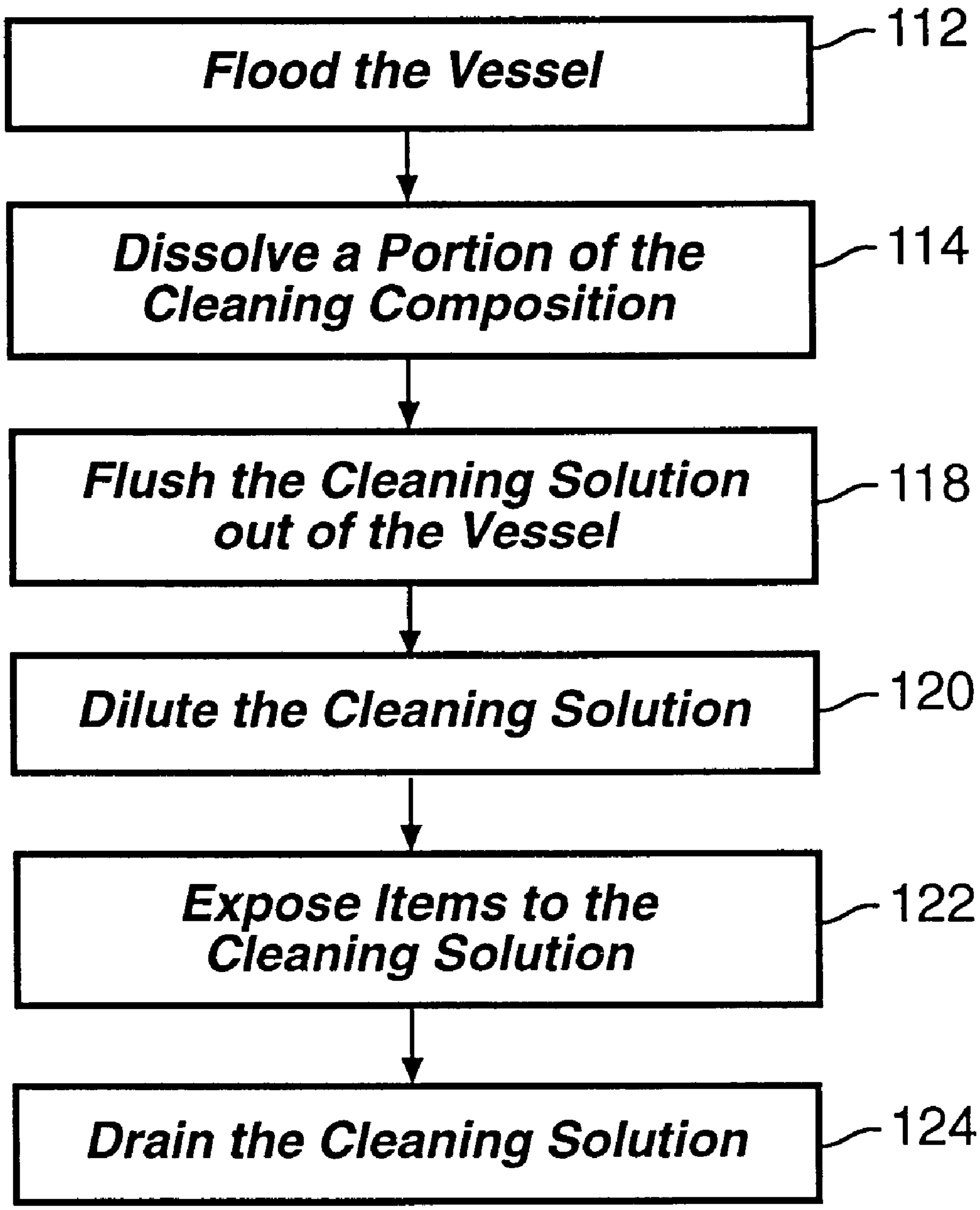
FIG. 10 is a schematic diagram of a method for carrying out a wash cycle according to the invention.

FIG. 10 shows a possible washing cycle that incorporates the apparatus 10. After the water supply 12 has been turned on in the step designated 102 above, a first step 112 occurs, wherein the interior cavity 28, and hence the cartridge 30, of the vessel 27 is flooded with water from the water supply 12. Water from the water supply 12 enters the mixing tube 40 and is diverted through the separation tube 74 to reach the interior cavity 28. The valve 76 restricts flow through the separation tube 74 after a predetermined amount of water is delivered into the interior cavity 28. Since the portion of the cartridge 30 that dissolves is directly related to the amount of water in the cavity 28, limiting the inflow of water ensures that approximately the same amount of cleaning composition 11 is dissolved every time the vessel 27 is flooded. In one embodiment, the valve 76 is configured to allow about 0.68 quarts into the interior cavity 28.

Once the interior cavity 28 has flooded with water, a portion of the cartridge 30 (comprised of a cleaning composition 11) dissolves in the water in a second step 114. The cartridge 30 stops dissolving when the concentration of cleaner in the water reaches a predetermined equilibrium. As a result, a cleaning solution 17 is formed by a cleaning composition 11 dissolved in water. In one embodiment, the predetermined equilibrium concentration of the cartridge 30 is from 0.001% to 1% cleaning composition 11, by weight in water. Even more preferred is an equilibrium concentration from 0.01% to 0.2% cleaning composition 11 by weight. An equilibrium concentration of about 0.12% cleaning composition 11 is most preferred.

The time it takes for the cartridge 30 to reach equilibrium concentration depends on the type of cleaning composition 11, and the configuration of the cartridge 30. Cartridges with more surface area will reach equilibrium more quickly than those with less surface area. In one presently preferred embodiment, the cartridge is cylindrical with an annular cross section. The annular shape is beneficial because, as the cartridge dissolves, it retains approximately the same overall surface area. The inner surface area increases at approximately the same rate as the exterior surface area decreases. In one presently preferred embodiment, the cartridge is configured to reach equilibrium concentration in approximately 17 minutes.

Once the cartridge 30 reaches equilibrium concentration, the cleaning solution 17 leaves the interior cavity 28 and enters the water feed 14 via the siphon tube 78 in a third step 118. The valve 80 allows only a predetermined amount of cleaning solution 17 to be delivered into the water feed 14. In a fourth step 120, the water feed 14 leads to a cleaning chamber 18 of a cleaning appliance 16, wherein the cleaning solution 17 is diluted by excess water to a concentration suitable for cleaning.

The concentration of cleaning composition 11 used for cleaning may be any concentration that cleans the items within the cleaning chamber 18. In particular, cleaning concentration for a cleaning appliance 16 for washing clothing is that concentration needed to clean a load of clothing. However, a cleaning solution 17 that is diluted to a cleaning concentration from 0.0001% to 0.01% cleaning composition 11 by weight is presently preferred. Even more preferred is a cleaning concentration from 0.0014% to 0.002% cleaning composition 11 by weight. A cleaning concentration of about 0.0017% cleaning composition 11 by weight is most preferred.

Enough cleaning solution 17 should be delivered to the water feed 14, such that the cleaning composition 11 is at cleaning concentration when diluted into the cleaning appliance 16. The amount of cleaning composition 11 delivered to the water feed 14 is determined by the amount of cleaning solution 17 and the equilibrium concentration of the cleaning solution 17. Therefore, the vessel 27 should be configured to receive a predetermined amount of solvent (e.g., water), and the cleaning composition 11 in the cartridge 30 should be configured to dissolve a predetermined equilibrium concentration of cleaning composition 11 in the vessel 27.

Once the cleaning solution 17 has been delivered to the cleaning appliance 16, a fifth step 122 occurs, wherein items to be cleaned are exposed to the cleaning solution 17. This sixth step 122 may involve a number of different process steps, depending on the type of item to be cleaned. For example, items may be immersed in the cleaning solution 17, lightly sprinkled with the cleaning solution 17, exposed to cleaning solution 17 in gaseous form, stirred or tumbled through the cleaning solution 17, exposed to other, additional agents, or any combination of these or other cleaning processes known in the art. In a sixth step 124, the cleaning appliance 16 drains the cleaning solution 17, together with removed impurities, from the cleaned items.

Figure 11:
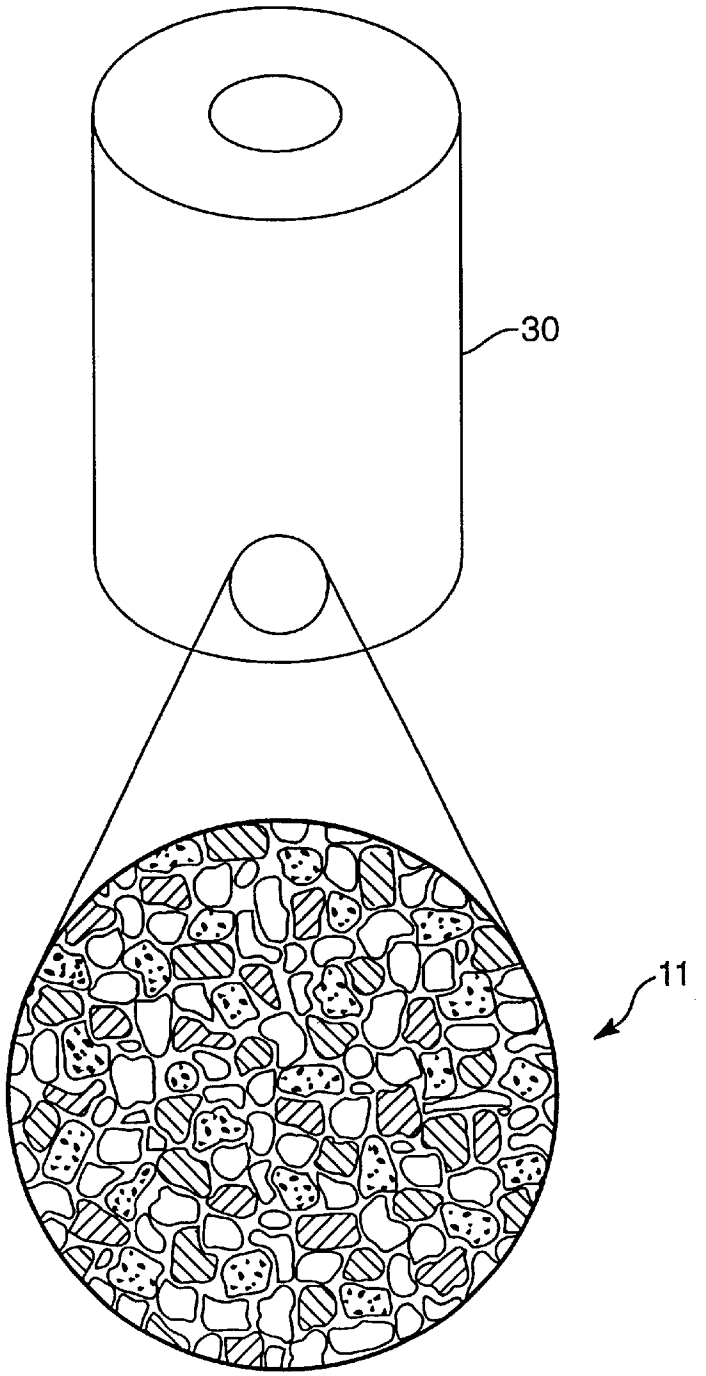
FIG. 11 is a perspective view of a replaceable cartridge in accordance with the invention.

Referring to FIG. 11, the cartridge 30 is shown in greater detail. The cleaning composition 11 relates generally to any composition of cleaner. As shown in FIG. 11, the cleaning composition 11 may include a mixture of different agents evenly dispersed throughout the cartridge 30 in a solid or semi-solid form. The cartridge 30 need not be unitary, but may be made up of cleaning composition 11 in powder or granular form. However, the cartridge 30 is preferably unitary and configured to remain firmly in place within the vessel 27. In one presently preferred embodiment, the cartridge 30 is cylindrical with an annular cross section, so that the time required for the cleaning composition 11 to dissolve remains relatively constant over multiple cycles of use.

Figure 12:
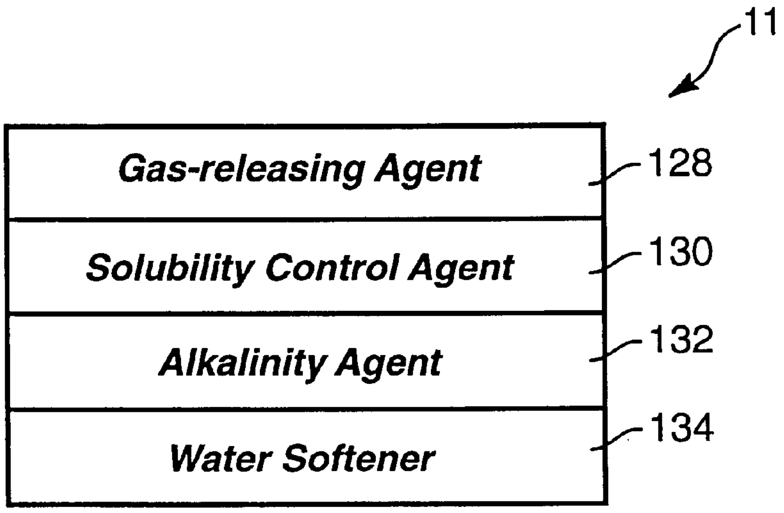
FIG. 12 is a schematic diagram of components that may form a composition suitable for the present invention.

Referring to FIG. 12, the cleaning composition 11 may include a gas-releasing agent 128 that is water soluble, and a solubility control agent 130 that is only slightly water soluble. The gas-releasing agent 128 provides cleaning action. However, if the gas-releasing agent 128 is permitted to freely dissolve, the resulting cleaning solution 17 will have an unknown or uncontrolled concentration of gas-releasing agent 128. Thus, it is desirable to add a solubility control agent 130 to the cleaning composition 11 to control its equilibrium concentration, and hence, the concentration of gas-releasing agent 128 in the cleaning solution 17.

The cleaning composition 11 may be further enhanced through the addition of an alkalinity agent 132 and a softener 134. The alkalinity agent 132 controls the pH of the cleaning composition 11, and therefore the pH of the resultant cleaning solution 17. The pH of the cleaning solution 17 must remain within a certain range because the pH controls the rate at which the gas-releasing agent 128 reacts. The gas-releasing agent 128 or the solubility control agent 130 may be configured to control the pH of the cleaning solution 17, but a separate alkalinity agent 132 is presently preferred. The softener 134 prevents the formation of a residue on the items to be cleaned by solvating hard water ions. The gas-releasing agent 128, the solubility control agent 130, or the alkalinity agent 132 may be configured to solvate hard water ions, but a separate softener 134 is preferable.

Figure 13:
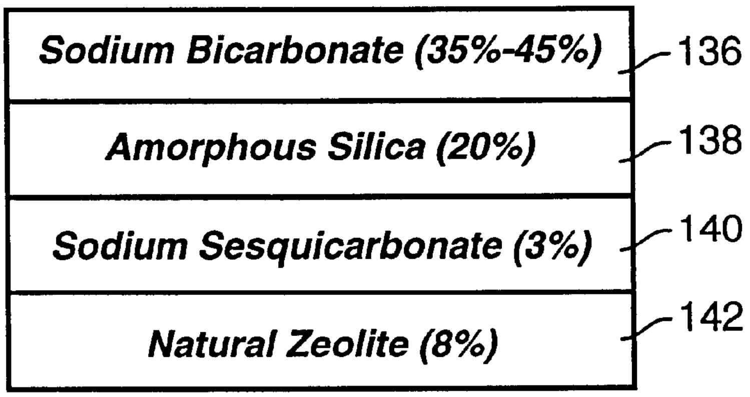
FIG. 13 is a schematic diagram of one embodiment of a composition according to the invention, including the components shown in FIG. 12.

Referring now to FIG. 13, an exemplary embodiment of the cleaning composition 11 is shown. The gas-releasing agent 128 should not release gas in the solid state cleaning composition 11, but it should be able to release gas in a cleaning solution 17 of the cleaning composition 11 at ambient temperature. The gas-releasing agent 128 need not react with other agents, but may simply decompose at ambient temperature to release gas. Those gas-releasing compounds that are both found in nature and biodegradable are preferred. In some embodiments, the gas-releasing agent 128 is a carbonate or bicarbonate. Sodium bicarbonate 136 ($NaHCO_3$), for example, is occurs in nature and is completely biodegradable. Alternatively, sodium carbonate ($Na_2CO_3$) may act as the gas-releasing agent 128. However, numerous other gas-releasing agents are known to those skilled in the art, and all are within the scope of the present invention.

The solubility control agent 130 should be either water insoluble or only slightly water soluble. Numerous compounds may serve this function, including but not limited to hydrophobic compounds. Those solubility control agents that are both found in nature and biodegradable are preferred. Amorphous silica 138 ($H_2SiO_3$) is presently preferred because it occurs in nature and is completely biodegradable.

The alkalinity agent 132 may be selected from, but is not limited to, a group consisting of alkali hydroxide, alkali hydride, alkali oxide, alkali carbonate, alkali bicarbonate, alkali phosphate, alkali borate, alkali salt of mineral acid, alkali amine, alkaloid, alkali cyanide, alkali metal, and alkali earth metal. Other alkalinity agents that tend to increase the pH of a neutral solution are familiar to those in the art, and are within the scope of the present invention. Those alkalinity agents that are both found in nature and biodegradable are preferred. Sodium sesquicarbonate 140, which includes sodium bicarbonate and sodium carbonate in an approximately 1:1 ratio, is presently preferred because it occurs in nature and is completely biodegradable.

The softener 134 should preferably be selected to exchange soluble sodium or other ions for the insoluble calcium and magnesium ions. Those softeners that are both found in nature and biodegradable are preferred. A cleaning composition 11 wherein the softener 134 is natural zeolite 142 ($Na_2O.Al_2O_3.(SiO_2)_x.(H_2O)_x$) is presently preferred because it occurs in nature and is completely biodegradable.

In one embodiment of the present invention, the cleaning composition 11 is intended to be dissolved in an apparatus for delivering solvated cleaning agents, wherein the cleaning composition 11 reaches equilibrium concentration before being flushed into a cleaning chamber and diluted to cleaning concentration. Therefore, the amount of each component in the cleaning composition 11 is preferably tailored to this purpose.

The amount of gas-releasing agent 128 in the cleaning composition 11 determines how much gas is released in a cleaning solution 17 of the cleaning composition 11 formed when the cleaning composition 11 dissolves in a solvent, e.g., water. Therefore, the gas-releasing agent 128 in the cleaning composition 11 should comprise an amount sufficient to release a predetermined amount of gas in a cleaning solution 17 of the cleaning composition 11. A concentration of gas-releasing agent 128 from 20% to 60% by weight of the cleaning composition 11 is preferred. In one embodiment, the concentration of gas-releasing agent 128 is from 35% to 45% by weight.

The amount of solubility control agent 130 in the cleaning composition 11 determines the equilibrium concentration of the cleaning composition 11 in the cleaning solution 17. Therefore, the amount of solubility control agent 130 in the cleaning composition 11 should be selected to yield a predetermined equilibrium concentration of cleaning composition 11 in the cleaning solution 17. A concentration of solubility control agent from 5% to 35% by weight of the cleaning composition 11 is presently preferred. In one embodiment, the concentration of solubility control agent is about 20% by weight to yield an equilibrium concentration of the cleaning composition 11 that is approximately 0.12% by weight in water. The amount of alkalinity 132 agent in the cleaning composition 11 affects the pH of the cleaning solution 17. Therefore, the cleaning composition 11 should include an amount of alkalinity agent 132 selected to provide a cleaning solution 17 with a predetermined pH. A concentration of alkalinity agent 132 from 1% to 10% by weight of the cleaning composition 11 is presently preferred. In one embodiment, the concentration of alkalinity agent 132 is about 3% by weight, providing a cleaning solution 17 with a pH of about 8.8 after dilution inside the cleaning appliance 16.

The softener 134 in the cleaning composition 11 softens the cleaning solution 17 by scavenging residue-forming ions. Therefore, the softener 134 should comprise an amount of cleaning composition 11 sufficient to soften household water. A concentration of softener 134 from 1% to 20% by weight of the cleaning composition 11 is presently preferred. In one embodiment, the concentration of the softener 134 is about 8% by weight.

Water molecules may form complexes with these components and could be bound up within the cleaning composition 11 by virtue of the process of making the cleaning composition 11. Water may comprise from 1 to 50% of the cleaning composition 11 by weight. Preferably, water comprises approximately 20% by weight of the cleaning composition 11.

Figure 14:
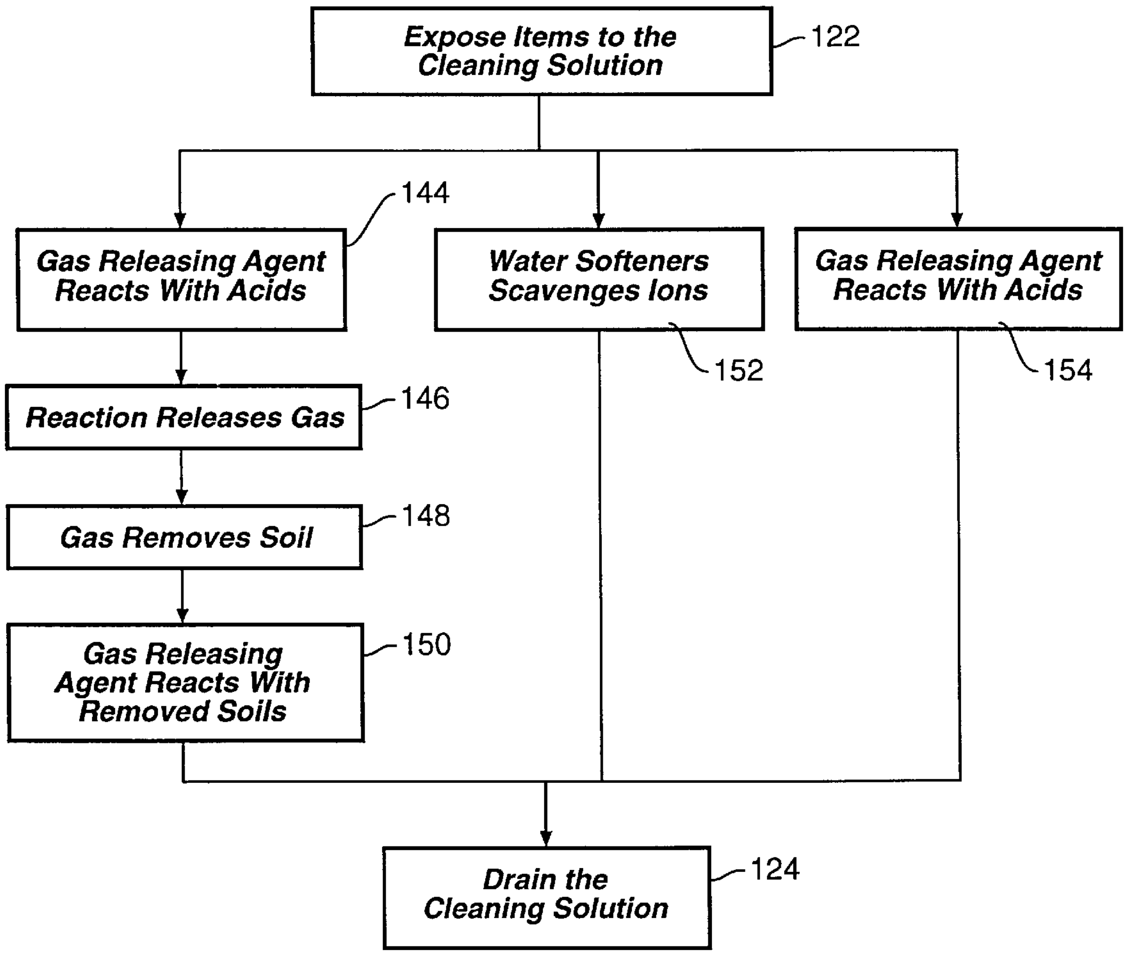
FIG. 14 is a schematic diagram of steps that may form a cleaning process according to the invention.

Referring to FIG. 14, after the items to be cleaned are exposed to the cleaning solution 17 in the fifth step 122 described in conjunction with FIG. 10, a number of processes occur. The basic cleaning solution 17 attacks the acids in dirt and oil. In a first reaction step 144, the gas-releasing agent 128 reacts with dirt and oil. In a gas-releasing step 146, gas is released. In a cleaning appliance 16 for washing clothing, dirt and oil would be dislodged from clothing in a removal step 148 due to reaction and the sudden release of gas. In a second reaction step 150, the gas-releasing agent 128 continues to react with removed soils.

Simultaneously, in a scavenging step 152, the softener 134 scavenges ions to prevent the buildup of residue on the articles to be cleaned. In addition, the alkalinity agent 154 keeps the pH of the cleaning solution 17 slightly basic. This serves two functions. First of all, it bridles the reaction of the gas-releasing agent 128 so that the gas evolves at a controlled rate and the cleaning solution 17 has time to become thoroughly intermixed with the articles to be cleaned. Second, the basic cleaning solution 17 reacts to neutralize acids in the soils. After the washing cycle is complete, the sixth step 124 described in conjunction with FIG. 10 occurs, wherein the cleaning solution 17 drains out of the cleaning appliance 16.

Figure 15:
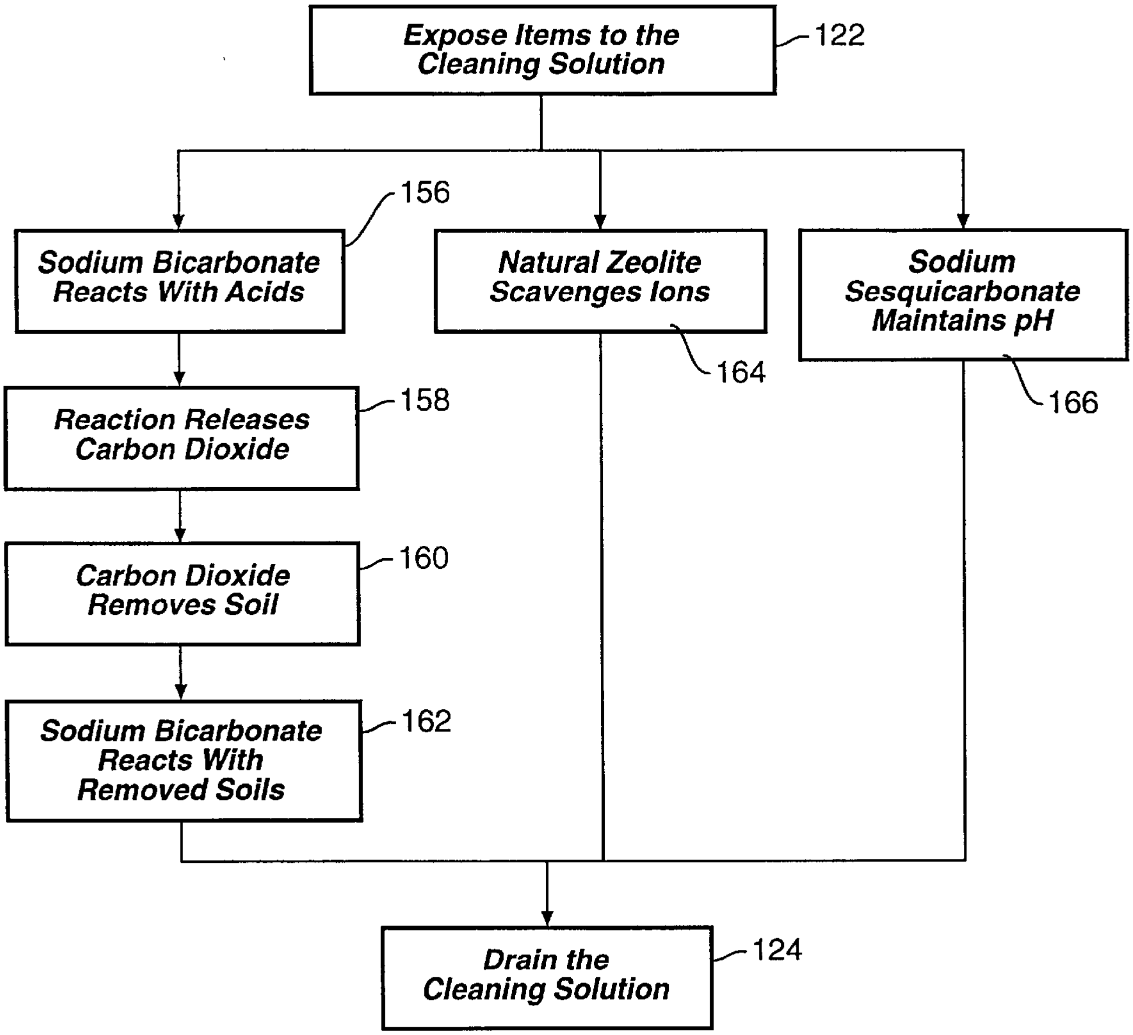
FIG. 15 is a schematic diagram of one embodiment of a cleaning process according to the invention, including the steps shown in FIG. 14.

Referring to FIG. 15, an exemplary cleaning process utilizing the exemplary cleaning concentration of FIG. 14 is shown. First, the sodium bicarbonate 136 and sodium sesquicarbonate 140 attack acids within the dirt and oils. The acid-base reactions have an emulsifying affect on the dirt and oils. Particularly, sodium bicarbonate 136 reacts with acids to generate carbon dioxide in an acid and base reaction: $H^+(aq)+NaHCO_3(aq)\rightarrow Na^+(aq)+H_2O+CO_2(g)$. Most oils and dirts found in clothing are slightly acidic, and so the sodium bicarbonate 136 may react with these dirts and oils to produce carbon dioxide. This tiny explosion of gas, as it bubbles out of solution, dislodges the dirt from clothes and other materials, allowing it to be washed away. The reaction yields sodium ions in solution, or the sodium salts of the oils and dirts of the reaction, water and carbon dioxide.

In this embodiment, the byproducts of the cleaning process appear in nature, so there is no need for the extensive treatment of phosphates and other non-biodegradable materials, as required by presently available detergents. Some of the sodium carbonate may also react to form carbon dioxide gas according to the following equation: $Na_2CO_3+2H^+\rightarrow 2Na^++H_2O+CO_2$. However, the alkalinity agent 132, which may include sodium carbonate, is added primarily to increase the pH of the cleaning solution 17.

The alkalinity agent 132 provides a mildly basic solution to prevent the sodium bicarbonate 136 from reacting with excess hydrogen ions (H+) in aqueous solution. Without the alkalinity agent 132, $CO_2$ would bubble out of solution too quickly as the sodium bicarbonate 136 reacts with random hydrogen ions. With a slightly alkaline cleaning solution 17, in one embodiment approximately 8.8 pH, the sodium bicarbonate 136 reacts at a controlled pace, and preferably with the acids in the dirts and oils.

The softener 134, which may be natural zeolite 142, exchanges sodium ions (Na+) for magnesium (Mg++) and calcium (Ca++) ions: $Mg^{++}+Ca^{++}+\text{zeolite}\rightarrow\text{zeolite}+4Na^{+}$. Sodium ions and sodium salts are readily water soluble and will not form precipitates. Without the softener, the $Mg^{++}$ and $Ca^{++}$ could react to form insoluble salts, precipitating out of solution and leaving a hard film behind, as shown by the following equations: $NaHCO_3+Mg^{++}\rightarrow MgCO_3$, and $NaHCO_3+Ca^{++}\rightarrow CaCO_3$.

Figure 16:
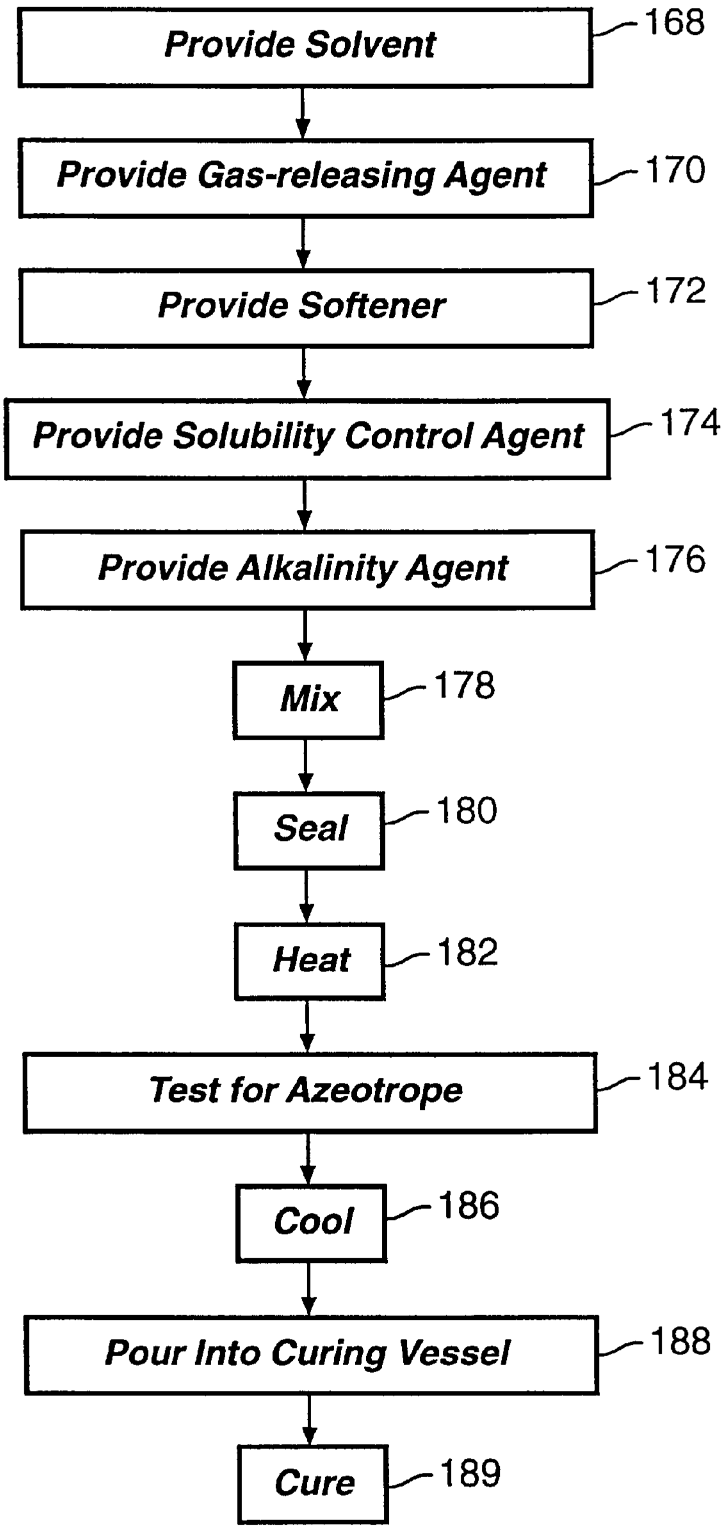
FIG. 16 is a schematic diagram of steps that may be used to make a cartridge according to the invention.

Referring to FIG. 16, one possible method is shown for making the cleaning composition 11 in a solid state. Although FIG. 16 depicts a solvent, a gas releaser, a solubility control agent, an alkalinity agent, and a solubility control agent, the cleaning composition 11 may be manufactured without these components or with additional, unnamed agents.

In a solvent step 168, a solvent for dissolving the other agents is provided. In a gas-releasing agent step 170, a gas-releasing agent 128 is added to the solvent. In a softener step 172, a softener 134 is added to the solvent. In a solubility control agent step 174, a solubility control agent 130 is added to the solvent. In an alkalinity agent step 176, an alkalinity agent 132 is added to the solvent. The steps 170 through 176 need not occur in the exact order described. In certain embodiments, steps 170 through 176 may occur simultaneously.

In a mixing step, the gas-releasing agent 128, the softener 134, the solubility control agent 130, and the alkalinity agent 132 are mixed into the solvent and preferably dissolved therein, by a mixing process such as stirring. In a sealing step 180, the entire solution is sealed within a suitable container. In a heating step 182, the solution within the sealed container is brought to a high temperature. In a testing step, 184, the solution is tested for an equilibrium concentration or azeotrope. In a cooling step 186, the solution is cooled, but remains in a liquid or semi-liquid state. In a pouring step 188, the solution is poured into a curing vessel of the appropriate size and shape to form a cartridge 30. In a curing step 189, the solution is allowed to cure over time.

Figure 17:
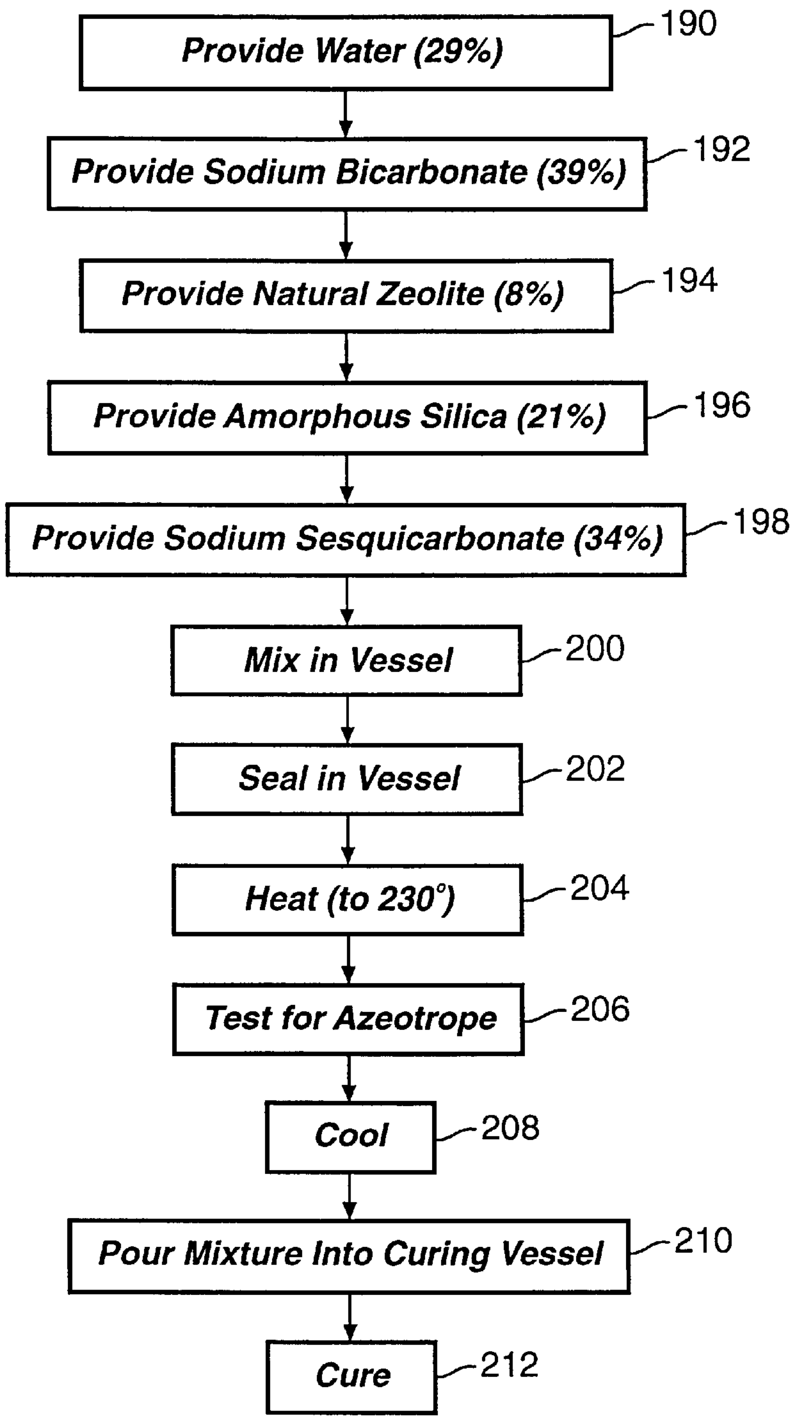
FIG. 17 is a schematic diagram of one embodiment of a process of making a cartridge according to the invention, including the steps shown in FIG. 16.

Referring to FIG. 17, an exemplary embodiment of the method of FIG. 16 is shown. More specifically, the method of FIG. 17 may be directly employed to obtain the cleaning composition 11 embodied in FIG. 13. In this illustrative method, the solvent is water. Enough water should be added to bring the mixture of components to a thick paste, such that they mix to an approximately homogenous consistency within a suitable vessel. In a water step 190, a sodium bicarbonate step 192, a natural zeolite step 194, an amorphous silica step 196, and a sodium sesquicarbonate step 198, 29% water may be supplemented with 39% sodium bicarbonate 136, 8% natural zeolite 142, 21% amorphous silica 138, and 3% sodium sesquicarbonate 140.

In a mixing step 200, the mixture may be stirred into solution. In a sealing step 202, the solution may be sealed within an airtight container. In a heating step 204, the solution may be heated to approximately 230° F. Testing for an equilibrium concentration or azeotrope may be performed in a testing step 206. In a cooling step 208, the solution may be permitted to cool to ambient temperature, while remaining in liquid or semi-liquid form. In a pouring step 210, the solution may be poured into a curing vessel. In a curing step 212, mixture may be permitted to cure to the solution, forming one or more properly shaped cartridges 30 of cleaning composition 11.

Figure 18:
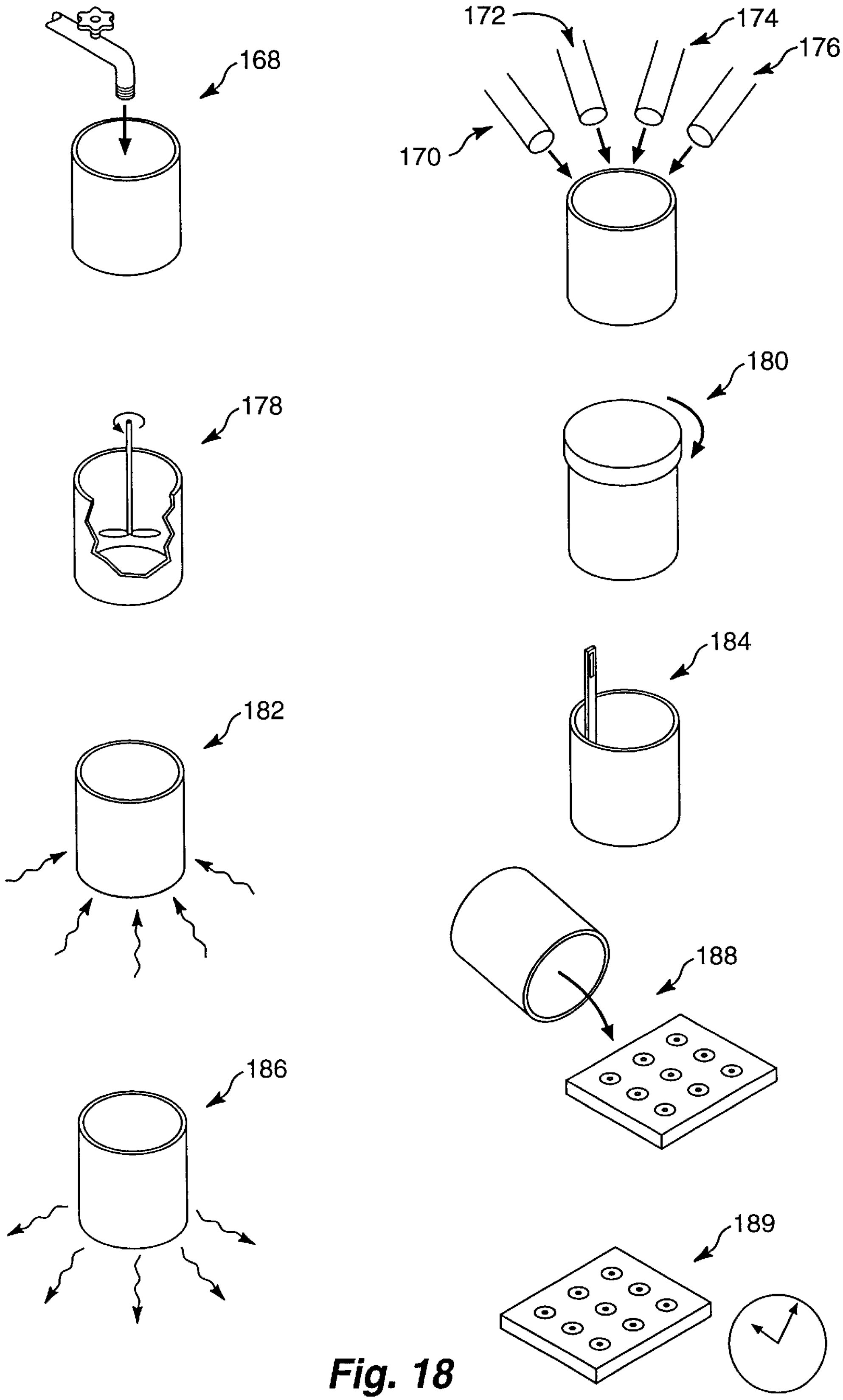
FIG. 18 is a pictorial process diagram of steps that may be used to make a cartridge according to the invention.

Referring to FIG. 18, a method for making the cleaning composition 11 in a solid state, as described in connection with FIG. 16, is shown pictorially. The vessel used for mixing, heating, and cooling may be of a simple design. In the pouring step 188, the solution may be poured into a mold with several indentations of the proper size and shape. As shown in FIG. 18, these indentations may be annular in shape to form a cartridge 30 with an annular cross section. After the curing step 189, the cartridges 30 may be removed from the mold for use in the apparatus 10.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method for delivering solvated cleaning agents to a cleaning appliance, the method comprising the steps of:

providing a dispensing apparatus;

providing a cleaning agent configured in a solid block having an outer surface, wherein the cleaning agent comprises a gas-releasing component configured to create mechanically explosive cleaning action at the interface between a soiling agent and a corresponding surface to be cleaned;

placing the cleaning agent into the dispensing apparatus;

providing a water supply;

routing a first portion of the water supply over the outer surface;

dissolving a selected portion of the solid block in the first portion of the water supply as a solvate; and exposing the soiling agent and the surface to be cleaned to the solvate.

2. The method according to claim 1, wherein the cleaning agent further comprises an alkalinity agent as a pH regulator and a solubility control component to limit the amount of gas releasing component in solution.

3. The method according to claim 2, wherein the solubility control component is substantially insoluble in water.

4. The method according to claim 3, wherein the solubility control component is amorphous silica.

5. The method according to claim 2, wherein the gas releasing component is selected from carbonates and bicarbonates.

6. The method according to claim 5, wherein the gas releasing component is present in the cleaning agent in an amount from 20% to 60% by weight.

7. A method for delivering solvated cleaning agents to a cleaning appliance, the method comprising the steps of:

providing a dispensing apparatus;

providing a cleaning agent configured in a solid block having an outer surface, wherein the cleaning agent comprises:

a gas-releasing component as a cleaning agent selected from the group consisting of carbonates and bicarbonates, wherein the gas-releasing component is present in an amount from 20% to 60% by weight;

a solubility control component to limit the solubility of the cleaning composition, wherein the solubility control component is present in an amount from 5% to 35% by weight; and an alkalinity agent as a pH regulator, wherein the alkalinity agent is present in an amount from 1% to 10% by weight;

placing the cleaning agent into the dispensing apparatus;

providing a water supply;

routing a first portion of the water supply over the outer surface;

dissolving a selected portion of the solid block in the first portion of the water supply as a solvate; and exposing a surface to be cleaned to the solvate.

8. The method for delivering solvated cleaning agents to a cleaning appliance according to claim 7, wherein the solubility control component is an amorphous silica.

9. The method for delivering solvated cleaning agents to a cleaning appliance according to claim 7, wherein the alkalinity agent is selected from the group consisting of sodium sesquicarbonate, alkali hydroxide, alkali hydride, alkali oxide, alkali phosphate and alkali borate.

10. The method for delivering solvated cleaning agents to a cleaning appliance according to claim 7, wherein the cleaning agent further comprises a water softener which is a natural zeolite to solvate metal ions in a solution of water.

11. A method for delivering cleaning solution to a cleaning appliance, the method comprising:

flooding a dispensing apparatus;

dissolving a selected portion from an outer surface of a substantially monolithic solid charge of cleaning agent;

equilibrating a solution of the cleaning agent;

flushing the dispensing apparatus;

delivering the solution to a cleaning appliance; and cleaning a surface of a material to be cleaned by a combination of reacting a base therewith and releasing a gas.

12. The method according to claim 11, wherein the dissolved cleaning agent consists essentially of:

a gas-releasing component as a cleaning agent selected from the group consisting of carbonates and bicarbonates;

a solubility control component which is an amorphous silica to limit the solubility of the cleaning composition;

an alkalinity agent as a pH regulator selected from the group consisting of sodium sesquicarbonate, alkali hydroxide, alkali hydride, alkali oxide, alkali phosphate and alkali borate; and optionally a water softener which is a natural zeolite to solvate metal ions in a solution of water.

13. The method of claim 11, wherein the gas-releasing component is present in an amount from 20% to 60% by weight.

14. The method of claim 11, wherein the solubility control component is present in an amount from 5% to 35% by weight.

15. The method of claim 11, wherein the water softener is present in an amount from 1% to 20% by weight.

16. The method of claim 11, wherein the alkalinity agent is present in an amount from 1% to 10% by weight.

17. The method of claim 11, wherein the alkalinity agent is present in an amount sufficient to give a solution of the composition a pH greater than 7.

18. The method of claim 11, wherein the alkalinity agent is present in an amount sufficient to give a solution of the composition a pH from about 7.8 to about 8.8.

* * * * *